Examiner's Room.
J. F. Gardner,
Sun Dial.
No. 75. (A.) Patented June 7, 1845.
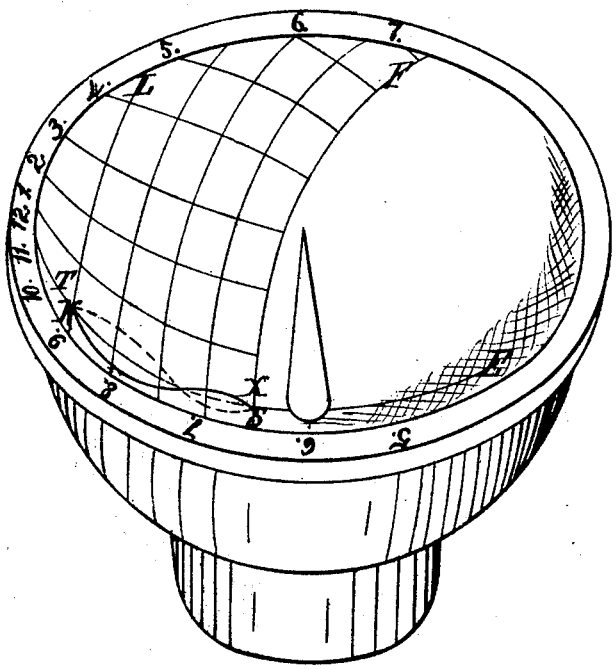
N. PETERS, PHOTO-LITHOGRAPHER, WASHINGTON, D. C.